G. J. SAYER.
MEAT GUIDE.
APPLICATION FILED SEPT. 14, 1914.
1,138,509.
Patented May 4, 1915.
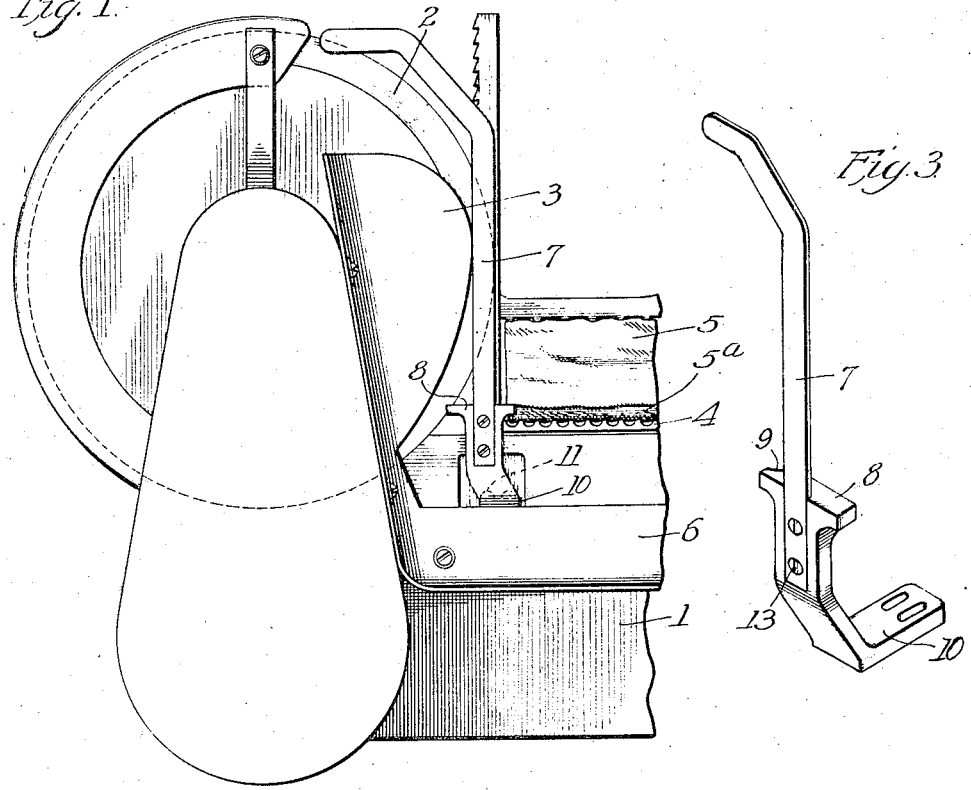
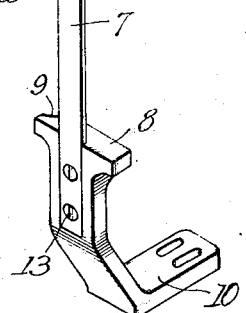
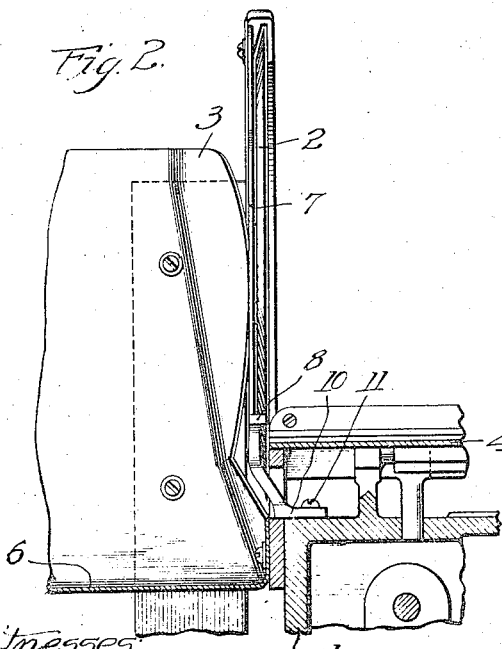
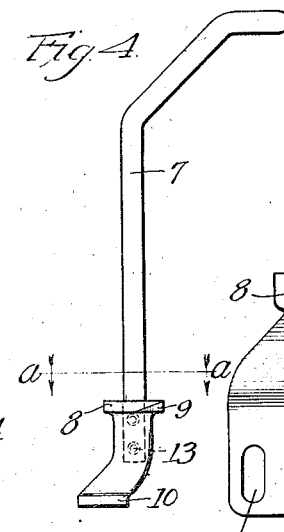
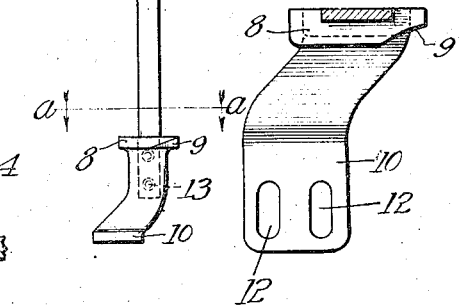
Witnesses:
Robert F. Weir
Arthur W. Carlson
Inventor:
George J. Sayer
By Max W. Zabel
Atty.

UNITED STATES PATENT OFFICE.

GEORGE J. SAYER, OF CHICAGO, ILLINOIS.

MEAT-GUIDE.

1,138,509.

Specification of Letters Patent.

Patented May 4, 1915.

Application filed September 14, 1914. Serial No. 861,616.

*To all whom it may concern:*

Be it known that I, GEORGE J. SAYER, a citizen of the United States, residing at Chicago, in the county of Cook and State of Illinois, have invented a certain new and useful Improvement in Meat-Guides, of which the following is a full, clear, concise, and exact description, reference being had to the accompanying drawing, forming a part of this specification.

My invention relates to meat guides for meat slicing machines and more particularly to that class of slicing machines having rotary circular knives and has for its object the provision of a device adapted to sustain in a measure the continuity of a slice so that it does not crumble after being severed and at the same time at one portion of the slice, preferably at the rind thereof forms a thin guideway for said slice between the guide and the knife so as to more firmly hold the slice at that particular point. In this connection reference may be had to my copending application Serial No. 850,461, filed July 11, 1914, in which I show a guide for the greater portion of the slice, my present invention having for its object the provision of a unitary self-contained structure or element capable of performing not only the functions outlined for the device in my copending application, but also providing a restricted guideway for a certain portion of the slice, thus performing a dual function.

My invention resides more particularly in the simplicity of the structure capable of performing the two functions aforesaid.

I will describe one form which my invention may take more in detail by referring to the accompanying drawing illustrating the same in which—

Figure 1 is a fragmentary side view of a slicing machine having my improved guide in position; Fig. 2 is a transverse sectional view of the machine showing my improved guide in position; Fig. 3 is a perspective view of the guide removed from the machine; Fig. 4 is an end view of the guide, and Fig. 5 is a sectional view on line *a—a* of Fig. 4.

Referring more particularly to Figs. 1 and 2, I show a slicing machine having a bed plate 1 upon which is suitably mounted a rotatable circular slicing knife 2 in any suitable way. A guide 3 is provided which separates the severed slice from the knife. A table 4 carries the meat 5 to be sliced, showing a rind portion 5ª. A plate 6 receives the severed slice, all as customary in slicing machines of this character. When slices of meat however are cut by the knife it frequently happens that the slices crumble, or at least do not maintain their shape when they are being guided by the plate 3 away from the knife. My improved guide 7 is mounted in close proximity to the knife as shown more clearly in Figs. 1 and 2 and serves between it and the plate 3 to maintain the slice in an uncrumbled condition.

However when wet meats or so-called green bacon having a soft skin is being cut, or even at other times, due to the peculiar formation of the rind, there is a tendency for the skin or rind to become ragged. Additional means must therefore be provided of a different character to guide this particular portion of the slice and to this end my improved guide 7 has a bracket 8 extending toward the knife into close proximity therewith as shown more clearly in Fig. 5, this bracket having a cut-away portion at 9 to conform to the bevel of the knife. A portion of very restricted cross-section is thus provided through which this particular portion of the slice has to pass, thereby tending to secure an evenly cut slice which has no tendency to become ragged or torn.

As stated, my invention concerns itself primarily with providing a firm element of such a nature as to perform the two guiding functions above referred to. It will be seen that the bracket forms part of a foot 10 which by means of the screws 11 is secured to the base plate of the machine in a suitably adjustable way, the holes 12 through which the screws pass being elongated to permit of this adjustment. It will be seen that the guide 7 is attached to the foot 10 by means of the screws 13 although of course it may be made integral and is so contemplated.

An important function performed by the guide 7 consists in preventing the cut slices of meat from being thrown violently away from the knife if the machine happens to be operated at a great rate of speed. When the machine is operated at such high rate of speed the tendency is to throw the cut slice violently away from the knife and these cut slices under those conditions frequently land on the floor, clearing the meat table altogether. The guide 7 prevents this objectionable feature.

Now if the bracket 8 alone were employed and the machine thus operated at a high rate of speed the slice would be torn, but I find that with the provision of both of the guiding elements referred to such tearing of the slice does not occur. The extreme simplicity of this structure thus providing these dual features may be readily apparent to those skilled in the art. It will also be understood that this structure must be firm and to this extent the particular bracket formation is relied on to provide these characteristics.

Having thus described one form which my invention may take, what I claim as new and desire to secure by Letters Patent is:

1. A meat slicing machine having a rotary circular knife, a meat diverter adjacent to said knife to divert the severed slice away from said knife, a double guide structure comprising an extended guide portion between which and said diverter the slice passes as it is being severed by the knife and also a protruding portion closely adjacent to one portion of the knife and conforming substantially to the bevel of the knife to form a restricted passageway for a portion of the slice.

2. A meat slicing machine having a rotary circular knife, guiding means alongside of said knife, said guiding means including an extended guiding portion to guide the major portion of the slice and comprising also a smaller guide portion in closer proximity to the knife to form a restricted passageway for a portion of the slice.

In witness whereof, I hereunto subscribe my name this ninth day of September A. D., 1914.

GEORGE J. SAYER.

Witnesses:
WM. A. CHAPIN,
JOHN M. PETERSON.